2,995,067
OPTICAL APPARATUS
William E. Glenn, Jr., Scotia, N.Y., assignor to General Electric Company, a corporation of New York
Filed Dec. 24, 1958, Ser. No. 782,957
9 Claims. (Cl. 88—61)

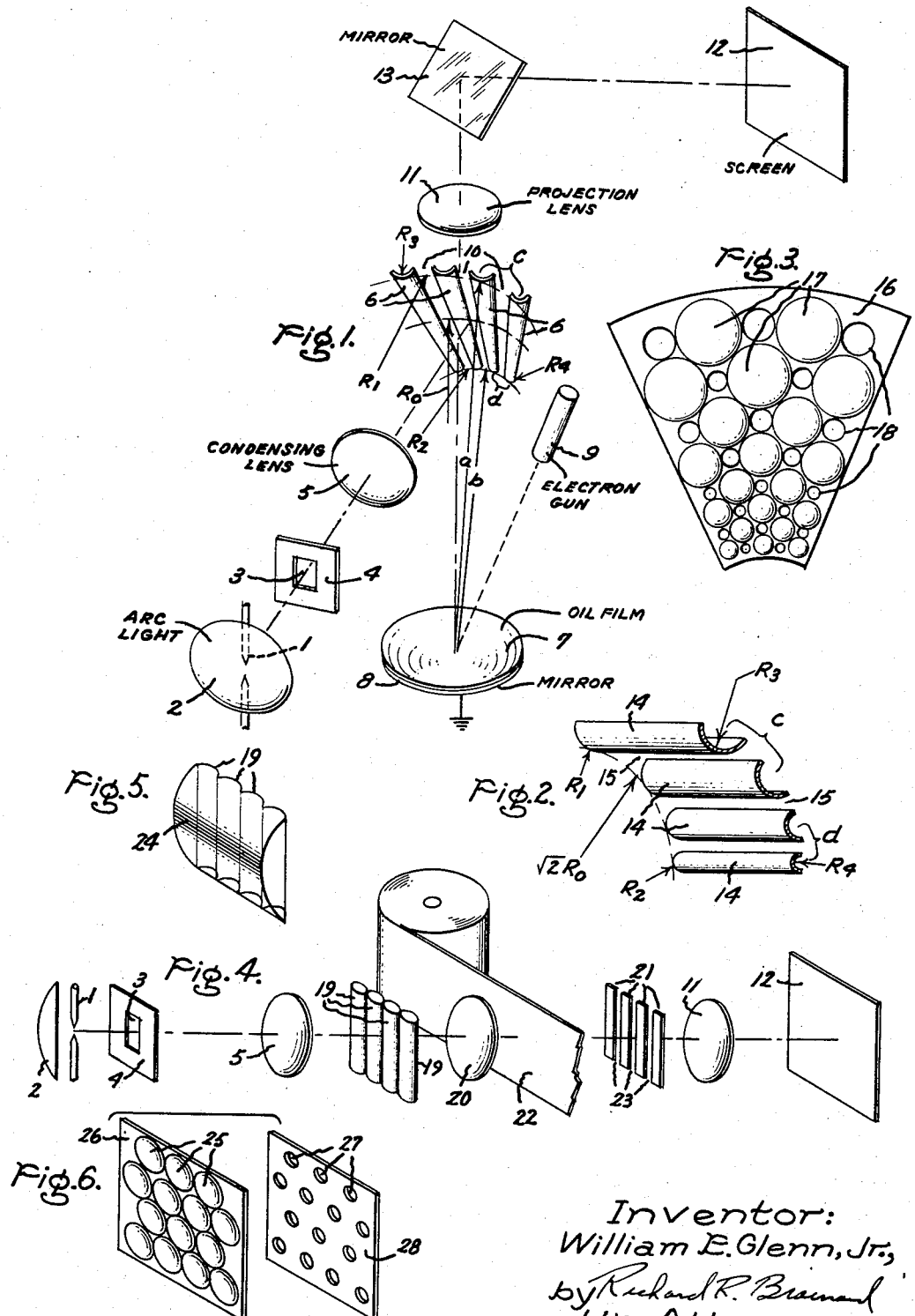

The present invention relates to an improved optical apparatus for systems in which light is diffracted to produce either monochrome or polychrome projected images.

In my U.S. Patent No. 2,813,146, which is assigned to the assignee of the present invention, I disclose a system for projecting color images corresponding to applied color television signals. In a preferred embodiment, an electron beam, that is modulated by these color television signals, deflects over the surface of a high resistivity deformable medium where it produces lines of electron charge. These lines, in turn, form three phase diffraction gratings having amplitudes and grating spacings that are functions, respectively, of the amplitudes of and the colors corresponding to the applied signals. When this medium is placed in a suitable optical apparatus, as for example, one disclosed in the aforementioned patent, white light transmitted through the medium is phase diffracted by the lines of depressions to produce zero order, first order, etc. diffracted light. A masking system, placed in the path of the diffracted light, transmits substantially only the first order diffracted red, green, and blue light diffracted by the respective diffraction gratings. This transmitted light is then projected on a screen where it produces a color image corresponding to the applied color television signals.

A plurality of spaced light beams are required in the optical apparatus for the brightest projected picture. These light beams can be produced by a plurality of separate sources, but it is more convenient and inexpensive to utilize a single light source in conjunction with a reflection or masking arrangement that splits the single beam from the light source into a plurality of beams.

Prior reflection and masking arrangements convert only a small portion of the light from the light source into these beams. Due to this lack of efficiency, a single light source of large wattage is required in order to obtained a projected image of the desired brilliance. Also, prior arrangements require a light source of large area to cast light over the complete raster on the deformable medium.

Accordingly, an object of the present invention is to provide a more efficient optical apparatus for diffraction-type projection systems.

Another object is to provide a diffraction-type optical apparatus in which a light source of relatively low wattage can be utilized.

Still another object of the present invention is to provide a diffraction-type optical apparatus in which a light source of relatively small area can be utilized.

These and other objects are achieved in one embodiment of my invention in which an optical apparatus is provided with a masking system having curved reflecting members. They focus substantially all of the light from the light source incident on them to narrow virtual images, which are the desired spaced sources of light.

The novel features believed characteristic of the invention itself, together with further objects and advantages thereof, may best be understood by reference to the following description taken in connection with the accompanying drawing in which:

FIG. 1 is a perspective illustration of a reflection-type optical apparatus embodiment of my invention, FIG. 2 is a perspective view of an alternative masking system that may be utilized in the apparatus of FIG. 1, FIG. 3 is a plan view of another masking system that may be utilized in the apparatus of FIG. 1, FIG. 4 is a perspective illustration of a transmission-type optical apparatus embodiment of my invention, FIG. 5 is a perspective view of an alternative lens system that may be utilized in the apparatus of FIG. 4, and FIG. 6 is a perspective view of an alternative lens and masking system that may be utilized in the apparatus of FIG. 4.

In my illustrated embodiment of FIG. 1, I provide a means for producing a plurality of sources of light. It includes a source 1 of intense polychrome light that is preferably white light, and that is imaged, by a mirror 2, at a transparent member or aperture 3 formed by an opaque frame 4. Aperture 3 limits the light beam to the desired size. The light transmitted by aperture 3 passes through a lens system 5 onto a focusing and masking means illustrated as a plurality of reflecting fan-shaped members 6 of curved cross-section. Due to their curvatures, members 6 reflect light that appears to originate from sources, one behind each member 6. Thus, a plurality of virtual light sources are formed equal in number to members 6. These are the desired plurality of light sources.

The light reflected from members 6 is focused onto a deformable light modulating medium 7 in a direction parallel to the center line of members 6. When there are no diffraction gratings in medium 7, this light is reflected back onto members 6 by a spherical, conducting mirror 8 beneath medium 7. Mirror 8 focuses the virtual light sources on members 6. Thus, members 6 also provide a masking function.

These diffraction gratings may be formed by an electron beam from an electron gun 9 in a manner that may be the same as that described in my Patent No. 2,813,146.

The diffraction gratings in medium 7 control the light transmitted by the focusing and masking means comprised of members 6. If these gratings have components parallel to the center line of the masking system, they diffract some of the reflected light through trapezoidally-shaped transparent members 10, illustrated as slits, between the reflecting members 6. In a color projection optical apparatus, substantially only certain colors of the first order diffracted light, e.g. red, green, and blue, are so diffracted. But in a black and white optical apparatus substantially all the colors of many orders of diffracted light are transmitted.

The light transmitted by transparent members 10 is projected by a lens system 11 on an image receiving surface, illustrated as a projection screen 12, after reflection through a 90° angle by a mirror 13. Mirror 13 permits the arrangement of screen 12 parallel with the axis of the optical apparatus.

The positions of members 6 is extremely significant. For the best defined images on screen 12, the edges of members 6, which define the positions of the transparent members 10, should be in the surface of best focus of mirror 8. Since mirror 8 is a spherical mirror, the surface of best focus is at circles concentric to the axis of the mirror 8.

Members 6 can be curved longitudinally to conform to the surface of best focus, but the manufacture of such members for many applications would be prohibitively expensive. Linear-edged members 6 are much less expensive.

The best focal surface for a spherical mirror along which linear-edged bars can be placed is a conical surface. If mirror 8 is a cylindrical rather than a spherical mirror, this surface is the surface of best focus. The best focal surface will be described in more detail after a discussion of the sizes and shapes of members 6.

Members 6 are curved either convex or concave (illustrated as convex) and preferably produce virtual line images (the virtual light sources) of the light passing through aperture 3. It will be appreciated, however, that if mirrors 6 are concave, and if the object distances are greater than the focal lengths of mirror 6, then real images produce the desired line light sources. The mirrors are formed from conical sections. The widths of these line images, which are determined by the radii of curvature of members 6 and the focal length of lens system 5, should be wider for a black and white projection system than for a color projection system. For the projection of black and white images, the widths of these line images should be narrower than the widths of members 6. Then the light from these images, when reflected back on members 6, is completely masked when there are no diffraction patterns in medium 7. Preferably, this reflected light is incident on members 6 in the central portion only, leaving strips on both sides of each member 6 that serve as "guard" regions to ensure that no light is incident on members 10. Also, for maximum light transfer transparent members 10 should be approximately equal in width to these reflected images.

For color projection, the line images have to be much narrower. Their width at any point is of the order of ⅓ to ⅙ of the distance at that point between the center lines of adjacent members 6. The widths of the transparent members 10 are within the same range.

In a color projection system, the specific widths of the line images and the transparent areas depend upon the desired spectral distribution; i.e., the relative magnitudes of the wavelengths that are to be transmitted. As is more fully explained in my application S.N. 782,955, filed concurrently herewith and assigned to the assignee of the present invention, these widths are determined by the insertion in the diffraction equation $$l_1 = \frac{l}{s}\lambda$$

of certain wavelengths λ from the spectral distribution curves. In this equation, "$l_1$" is the distance from the point of zero order diffraction on the masking system to the point where light of wavelength λ is diffracted by a diffraction grating having a grating spacing "$s$". "$l$" is the distance between the masking system and the center of modulating medium 7. Due to the tilt of members 6, "$l$" has different values for different points along the lengths of members 6. Consequently, the widths of the line images, and thus the radii of curvature of members 6, as well as the widths of transparent members 10 vary along the lengths of members 6. That is, the center to center spacings of the members 6 taper in a direction along member 6. In the resulting configuration, members 6 are conical sections that with transparent members 10 form a fan-shaped masking system.

The specific shapes and positions of the curved reflecting members 6 in FIG. 1 can be further defined for both monochrome and polychrome projection by the following equation:

$$R_1/R_2 = R_3/R_4 = a/b = c/d$$

wherein $R_1$ and $R_2$ are the radii of curvature along the upper and lower ends, respectively, of the members 6, $R_3$ and $R_4$ are the radii of the upper and lower ends, respectively, of members 6, "$a$" is the distance from the center of mirror 8 to the top edge of a member 6, "$b$" is the distance from the lower edge of this member 6 to the center of mirror 8, "$c$" is the center-to-center spacing of adjacent members 6 at the top edges thereof, and "$d$" is the center-to-center spacing at the lower edges.

The distance to the center line of the masking system, which distance is indicated as $R_0$ in FIG. 1, is equal to one-half the radius of curvature of mirror 8. The radius at the center of members 6 is $\sqrt{2R_0}$.

Since the sizes of and separations between members 6 are fixed, the number of members 6 utilized depends upon the aberrations that can be tolerated. These aberrations result from the action of lens 5, mirror 8, and lens 11. The farther that members 6 extend off the axis of the optical apparatus, the more the aberrations are introduced. Thus, a compromise must be made between brightness of the projected image, which is dependent upon the number of members 6, and the tolerable aberrations. In a typical application there may be fifteen members 6.

The embodiment of FIG. 1 is efficient in its utilization of light. Substantially all of the light passing through aperture 3 and incident on members 6 is reflected to medium 7. Consequently, this optical apparatus is much more efficient than a prior reflection type optical apparatus in which only a small portion of the light incident on the reflecting areas is utilized. The more efficient utilization of the light permits the use of a smaller wattage light source 1 for a given light intensity at the screen.

The physical size of the required light source is decreased due to the magnifying or spreading action of the curved members 6. That is, the combination of the size of the aperture 3, the radius of curvature of bars 6, and the focal length of lens 5 must produce a light image that completely fills the raster on medium 7. Because of the light spreading action of members 6, the size of aperture 3, and thus of light 1, can be smaller than if non-spreading members, such as flat members, are utilized.

Another advantage of my invention is that the color shading described and claimed in my copending application S.N. 782,956, filed concurrently herewith and assigned to the assignee of the present invention, can be economically utilized in an optical apparatus of the present invention merely by placing filters along the two vertical interior edges of frame 4.

In FIG. 2 there is illustrated another focusing and masking means that can be used. It must be positioned in the optical apparatus such that its curved reflecting members 14, which are illustrated as cylindrical element bars, are parallel to the grating lines in medium 7. Then the diffraction grating will diffract light through rectangular-shaped transparent members 15, which are illustrated as slits between reflecting members 14. Also, the long dimension of aperture 3 should be parallel with members 14. Members 14 are arranged along an arc varying in radii from $R_1$ at one end to $R_2$ at the other end, with a central radius of $\sqrt{2R_0}$. The radii of members 14, which range from $R_3$ for the largest at one end to $R_4$ for the smallest at the other end, agree with the equation:

$$R_1/R_2 = R_3/R_4 = a/b = c/d$$

wherein "$a$" is the minimum distance from the largest member 14 to the center of mirror 8, "$b$" is the minimum distance from the smallest member 14 to the center of mirror 8, "$c$" is the separation between center lines of the largest member 14 and the member 14 adjacent to it, and "$d$" is the separation between center lines of the smallest member 14 and the adjacent member 14 to it. A similar equation can be obtained by conventional optical considerations for the placement, radii, and separations for the other reflecting members 14. This arrangement may also be defined as that which produces the same focusing and masking results as the focusing and masking means of the FIG. 1 embodiment.

In my embodiments so far described, I have illustrated focusing and masking means having elongated reflecting and transparent members. However, masking means with other shaped members can be used. To illustrate this, I have shown in FIG. 3 a focusing and masking means comprising a curved opaque body 16 with circular-shaped reflecting members 17 that are spherical mirrors positioned between circular transparent members 18, which may be apertures or merely circular transparent portions of body 16. Body 16 may be curved along the surface defined by the reflecting members 6 in FIG. 1.

Members 17, which have a plurality of different sizes, are arranged in a fan-shaped pattern so that the light reflected from them to mirror 8 and back again passes through members 18 as a function of the parameters of the diffraction gratings in medium 7, e.g. grating spacing and amplitude.

The dimensions for members 17 and 18 can be determined in the manner previously described. That is, the radii of members 18 are approximately the same as the radii of members 6 and 14 in corresponding positions. For example, the radii of the members 17 in the top row are approximately equal to the radius $R_3$ of members 6 and 14. Similarly, the diameters of transparent members 18 are the same as the widths of the transparent members 10 and 15 for corresponding positions.

Members 17, being focusing elements, have the same advantages mentioned in the discussion of members 6 of FIG. 1.

In FIG. 4 I have illustrated a transmission-type optical apparatus embodiment of my invention. In this embodiment, the plurality of light sources are produced by a plurality of parallel lenses 19 arranged in side-by-side contact. These lenses 19, although illustrated as cylindrical, may be elliptical or another form of lens. Each of these lenses 19 focuses substantially all of the incident light thereon into a small line light source, parallel with the axis of the lens. Each line light source is imaged by a lens system 20 onto one of the opaque members 21 of a masking system after transmission through a light modulating medium 22, providing there are no diffraction gratings in medium 22. Medium 22 is illustrated as a tape with a thermoplastic surface in which diffraction gratings may be impressed. Diffraction gratings in medium 22 having components parallel with transparent members 23 in the masking system, diffract light through these transparent members 23 to be imaged by a lens system 11 on a projection screen 12.

A method, apparatus and medium for recording information as deformations of a thermoplastic medium is described and claimed in my copending application Serial No. 8,842, filed February 15, 1960, said application being a continuation-in-part of my application Serial No. 698,167, filed November 27, 1957 (now abandoned). Both of said applications are assigned to the assignee of the present invention.

The widths of the line light sources formed by lenses 19 should be narrow. For black and white projection, they must be sufficiently narrow such that when imaged on the masking system they are completely masked when there are no diffraction gratings in medium 22. For color projection, they must be narrow enough to meet this condition and also to ensure that when there are diffraction gratings in medium 22 only the desired colors are incident on members 23. A more detailed explanation of the determinations for these widths as well as the widths of members 21 and 23 is presented in my application Serial No. 782,955, filed concurrently herewith, and assigned to the assignee of the present invention.

The illustrated optical apparatus is much more efficient than the prior ones since all of the light incident on lenses 19 is used to form the line sources of light. In the prior optical apparatuses a masking system with parallel slits is used instead of lenses. Only the light incident on the slits forms the line sources of light.

In FIG. 5 I have illustrated a focusing means that can replace the lens system 5 and the focusing means 19 of FIG. 4. In the focusing means of FIG. 5, a cylindrical lens 24 is arranged normally, and in back-to-back relationship with cylindrical lenses 19. Lens 24 images aperture 3 on medium 22 while, of course, the lenses 19 form the lines of light.

In FIG. 6 I have illustrated a focusing means and a masking means that can be substituted for the corresponding components in the optical apparatus of FIG. 4. In FIG. 6 the focusing means comprises a plurality of spherical lenses 25 mounted in contacting relationship in an opaque body 26. Since lenses 25 focus the incident light from source 1 into circular spaced beams, the masking means should have circular transparent members 27 and of course must have an opaque body 28.

Lenses 25 should form circles of light the diameters of which are equal to the widths of the line light sources formed in FIG. 4. The diameters of members 27 should equal the widths of members 23.

The beams of light from lenses 25 are focused by lens system 20 on the opaque body 28 in the absence of diffraction gratings in the light modulating medium 22. But diffraction gratings therein diffract light through members 27 as a function of the parameters of the diffraction gratings.

Lenses 19 and 25, in common with reflecting members 6 and 14, focus or condense the light from the light source 1 into the required spaced light images. With this condensing action these lenses can be much larger, and thus intercept more light, than is possible otherwise. Also, because the lenses 19 and 25 spread the light over the raster area on medium 22, light source 1, as well as aperture 3, can be smaller.

While the invention has been described with respect to certain specific embodiments, it will be appreciated that many modifications and changes may be made by those skilled in the art without departing from the spirit of my invention. I intend, therefore, by the appended claims, to cover all such modifications and changes as fall within the true spirit and scope of the invention.

What I claim as new and desire to secure by Letters Patent of the United States is:

1. An optical apparatus for producing an image on an image receiving surface corresponding to information contained in a diffraction grating in a light modulating medium, comprising a light source, masking between said image receiving surface and said light modulating medium, a plurality of optical means for individually focusing light from said single light source into a plurality of line light beams which are projected on said light modulating medium, said masking means being positioned to transmit to said image receiving surface substantially only certain light diffracted by said diffraction gating.

2. The optical apparatus as defined in claim 1 wherein said light focusing means and said masking means comprises a plurality of focusing mirrors and transparent members between said focusing mirrors.

3. The optical apparatus as defined in claim 1 wherein said light focusing means comprises a plurality of closely spaced converging lenses.

4. An optical apparatus for transmitting light as a function of parameters of a diffraction grating in a transparent medium comprising a source of light, a plurality of lenses for condensing light from said source into a plurality of spaced images of light which serve as light sources for projecting light on said medium, and masking means for masking light transmitted through said medium that is not diffracted, said masking means having transparent members for transmitting diffracted light as a function of the parameters of diffraction gratings in said medium.

5. The apparatus as defined in claim 4 wherein said plurality of lenses comprise a plurality of longitudinally extending, converging lenses arranged in side-by-side contact along the long sides thereof.

6. The apparatus as defined in claim 4 wherein said plurality of lenses comprise a plurality of circular, converging lenses arranged in contacting relationship.

7. An optical apparatus for transmitting light as a function of parameters of a diffraction grating in a light modulating medium, comprising a source of light, a plurality of curved reflecting members separated by transparent members for focusing light from said light source into light beams having spaced images which serve as light sources for projecting light on said medium, and a mirror associated with said medium for reflecting light from said reflecting members that is incident on said medium back onto said reflecting members in the absence of diffraction gratings in said medium.

8. An optical apparatus for transmitting light as a function of parameters of diffraction gratings in a light modulating medium, comprising a source of light, a plurality of curved spaced reflecting members for focusing light from said light source into light beams having spaced images which serve as light sources for projecting light on said medium, and a focusing mirror associated with said medium for focusing light reflected from said members back onto said members in the absence of diffraction gratings in said medium, said members being arranged on a curved surface such that the spaces between said members are approximately on the surface of best focus of said focusing mirror, said members having sufficient curvature that the light focused back on said members by said focusing mirror is substantially masked by said members in the absence of diffraction gratings in said medium.

9. An optical apparatus for transmitting light as a function of parameters of a diffraction grating in a light modulating medium, comprising a source of light, and a plurality of curved reflecting members separated by transparent members for focusing light from said light source into light beams having spaced images which serve as light sources for projecting light on said medium, and means for masking light transmitted by said medium that is not diffracted.

References Cited in the file of this patent

UNITED STATES PATENTS

| | | |
|---|---|---|
| 2,391,450 | Fischer | Dec. 25, 1945 |
| 2,391,451 | Fischer | Dec. 25, 1945 |
| 2,605,352 | Fischer | July 29, 1952 |
| 2,644,938 | Hetzel et al. | July 7, 1953 |